(12) United States Patent
Yoshida et al.

(10) Patent No.: US 9,391,491 B2
(45) Date of Patent: Jul. 12, 2016

(54) POWER TOOL

(71) Applicant: Hitachi Koki Co., Ltd., Tokyo (JP)

(72) Inventors: Kenichirou Yoshida, Hitachinaka (JP);
Katsuhiro Oomori, Hitachinaka (JP);
Yoshihiro Komuro, Hitachinaka (JP);
Kazutaka Iwata, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 347 days.

(21) Appl. No.: 14/032,260

(22) Filed: Sep. 20, 2013

(65) Prior Publication Data

US 2014/0015350 A1    Jan. 16, 2014

Related U.S. Application Data

(63) Continuation of application No. 13/446,355, filed on Apr. 13, 2012, now Pat. No. 8,541,913, which is a continuation of application No. 12/104,590, filed on Apr. 17, 2008, now Pat. No. 8,253,285.

(30) Foreign Application Priority Data

Apr. 27, 2007 (JP) ............................... P2007-118834
May 28, 2007 (JP) ............................... P2007-140239
May 30, 2007 (JP) ............................... P2007-143164

(51) Int. Cl.
*H02K 7/14* (2006.01)
*H02K 5/20* (2006.01)
*H02K 9/06* (2006.01)

(52) U.S. Cl.
CPC .................. *H02K 7/145* (2013.01); *H02K 5/20* (2013.01); *H02K 9/06* (2013.01)

(58) Field of Classification Search
CPC ...... H02K 7/145; H02K 7/14; H02K 11/0073
USPC ............................................ 310/50, 43, 68 D
See application file for complete search history.

(56) References Cited

U.S. PATENT DOCUMENTS 4,081,704 A    3/1978    Vassos et al.
4,204,313 A    5/1980    Khutoretsky et al.
(Continued)

FOREIGN PATENT DOCUMENTS

CN          1441531 A        9/2003
CN       1441531 (A)         9/2003
(Continued)

OTHER PUBLICATIONS

Office Action German Patent Application No. 102008020144.8 dated Nov. 30, 2015 with English translation.
(Continued)

*Primary Examiner* — Naishadh Desai
(74) *Attorney, Agent, or Firm* — McDermott Will & Emery LLP

(57) ABSTRACT

A power tool includes a housing, a brushless motor, and a cover member. The housing has an air intake hole and an air exhaust hole formed therein, the housing having an inner surface. The brushless motor has an outer surface disposed in the housing, a first endface near the air intake hole, and a second endface near the air exhaust hole. The cover member covers at least one of the first endface and the second endface for preventing dust from entering the brushless motor. The inner surface of the housing and outer surface of the brushless motor define a circulation path providing communication between the air intake hole and the air exhaust hole.

7 Claims, 10 Drawing Sheets

(56) References Cited

U.S. PATENT DOCUMENTS

| | | | | |
|---|---|---|---|---|
| 5,070,319 | A | * | 12/1991 | Scuka .................. F25D 29/008 310/323.21 |
| 5,099,160 | A | * | 3/1992 | Strozel ............... B23Q 11/0064 310/47 |
| 5,939,807 | A | * | 8/1999 | Patyk .................... H02K 5/161 310/64 |
| 6,819,022 | B2 | | 11/2004 | Yamamoto et al. |
| 7,053,567 | B2 | | 5/2006 | Yamamoto |
| 7,462,965 | B2 | | 12/2008 | Natsuhara et al. |
| 2003/0089511 | A1 | | 5/2003 | Tsuneda et al. |
| 2003/0173924 | A1 | | 9/2003 | Blasé et al. |
| 2003/0173925 | A1 | | 9/2003 | Strobl et al. |
| 2004/0017119 | A1 | | 1/2004 | Yamamoto |
| 2005/0212367 | A1 | * | 9/2005 | Blase ..................... F02M 37/08 310/68 B |
| 2006/0255756 | A1 | * | 11/2006 | Iwata ..................... B25F 5/008 318/400.41 |
| 2006/0261689 | A1 | | 11/2006 | Natsuhara et al. |
| 2007/0046127 | A1 | | 3/2007 | Kloeppel et al. |

FOREIGN PATENT DOCUMENTS

| | | |
|---|---|---|
| DE | 3147501 A1 | 6/1983 |
| DE | 3430023 A1 | 2/1986 |
| DE | 19816684 A1 | 12/1999 |
| DE | 10228129 A1 | 5/2003 |
| DE | 10311070 A1 | 11/2003 |
| DE | 102004056990 A1 | 6/2006 |
| GB | 2171853 A | 9/1986 |
| JP | 63-11272 | 1/1988 |
| JP | 01-009252 | 3/1989 |
| JP | 02-22072 | 2/1990 |
| JP | 03-52535 | 3/1991 |
| JP | 03-89836 | 4/1991 |
| JP | 08-289505 | 11/1996 |
| JP | 2001-157408 | 6/2001 |
| JP | 2004-007869 | 1/2004 |
| JP | 2004-274800 | 9/2004 |
| JP | 2004274800 A | 9/2004 |
| JP | 2004-322274 | 11/2004 |
| JP | 2004-357371 | 12/2004 |
| JP | 2005-102370 | 4/2005 |
| JP | 2005-176451 | 6/2005 |
| JP | 2006-333587 | 12/2006 |
| JP | 2006-333669 | 12/2006 |

OTHER PUBLICATIONS

Japanese Office Action dated Dec. 22, 2011; Application No. JP2007-118834; 5 pages.

Japanese Office Action dated Jan. 10, 2012; Application No. JP2007-140239; 5 pages.

Japanese Office Action dated Jan. 10, 2012; Application No. JP2007-143164; 5 pages.

Chinese Office Action dated Jun. 24, 2010 for Application No. 200810093541.8.

* cited by examiner

POWER TOOL

CROSS REFERENCE TO RELATED APPLICATIONS

This application is a continuation application of Ser. No. 13/446,355, filed Apr. 13, 2012, which is a continuation application of application Ser. No. 12/104,590, filed Apr. 17, 2008, now U.S. Pat. No. 8,253,285, issued Aug. 28, 2012 which claims priority from Japanese Patent Application No. 2007-118834 filed Apr. 27, 2007, Japanese Patent Application No. 2007-140239 filed May 28, 2007, and Japanese Patent Application No. 2007-143164 filed May 30, 2007. The entire content of each of these priority applications is incorporated herein by reference.

BACKGROUND OF THE INVENTION

1. Field of the Invention

The present invention relates to a power tool employing a brushless motor.

2. Description of the Related Art

Brushless motors have commonly been employed in power tools to achieve a more compact design because brushless motors do not require an electrical connection using a brush and commutator for a rotor mounted on a rotational shaft. However, the relatively large power loss that occurs when the brushless motor is driven produces heat that can affect the motor operations, leading to a reduction in efficiency or malfunctions. In fact, loss in a stator unit is a primary source of heat generation and comprises copper loss occurring when an electric current flows through the stator coil, and iron loss occurring in the stator core material due to changes in magnetic flux density. Consequently, cooling mechanisms have been proposed for a variety of stators in conventional brushless motors. A cooling mechanism for a conventional stator disclosed in Japanese unexamined patent application publication No. 2004-274800, for example, comprises first openings formed in a motor housing for drawing external air into the housing, and second openings formed in the housing on the opposite side of the stator from the first openings in the axial direction of the rotational shaft for exhausting cooling air from the housing. A fan integrally mounted on the rotor draws air into the housing and generates, in particular, a flow of air through the stator coil, thereby directly cooling the stator coil area.

Further, output transistors in the brushless motor constituting switch elements for an inverter circuit board (motor-driving circuit board) generates a large amount of heat when supplying a large current drive signal to the stator coil. Hence, measures must be taken to cool these components. Japanese unexamined patent application publication No. 2005-102370 proposes a mechanism for cooling the inverter circuit board, along with the stator unit of the motor, by disposing these components in a channel along which cooling air flows through the motor housing.

However, while the above mechanisms are capable of cooling the stator and inverter circuit board of a brushless motor by introducing external air, circulating external air through the stator invites dust particulate in the air to accumulate on the rotor and stator.

SUMMARY OF THE INVENTION

In view of the foregoing, it is an object of the present invention to provide a power tool with a structure for cooling a brushless motor while controlling dust buildup.

This and other object of the present invention will be attained by a power tool including a housing, a brushless motor, and a cover member. The housing has an air intake hole and an air exhaust hole formed therein, the housing having an inner surface. The brushless motor has an outer surface disposed in the housing, a first endface near the air intake hole, and a second endface near the air exhaust hole. The cover member covers at least one of the first endface and the second endface for preventing dust from entering the brushless motor. The inner surface of the housing and outer surface of the brushless motor define a circulation path providing communication between the air intake hole and the air exhaust hole.

In still another aspect of the invention there is provided a power tool including a housing having an inner surface, a brushless motor supported by the housing, and the circuit board. The brushless motor includes a stator, a coil, a rotor, and an insulating member. The stator has a cylinder part and a plurality of teeth. The cylinder part has an inner peripheral surface, and an outer peripheral surface held by the inner surface of the housing. The plurality of teeth extends in an axial direction of the cylinder part and protruding radially inward from the inner peripheral surface. The coil has a wound portion wound along the teeth; and a beginning portion connecting the wound portion to the circuit board and being formed in a bent shape so as not to interfere with the wound portion. The rotor is concentric with the stator and rotatably disposed on a side of the inner peripheral surface of the stator. The insulating member has an annular part having an axial end of the stator, and a stator-covering part. The stator part covers the teeth for insulating the teeth and the coil, the insulating member being held on the stator by winding the coil about the teeth covered by the stator-covering part. The circuit board is held on the annular part and electrically connected to the coil and controlling the brushless motor.

DESCRIPTION OF THE PREFERRED EMBODIMENTS

Figure 1:
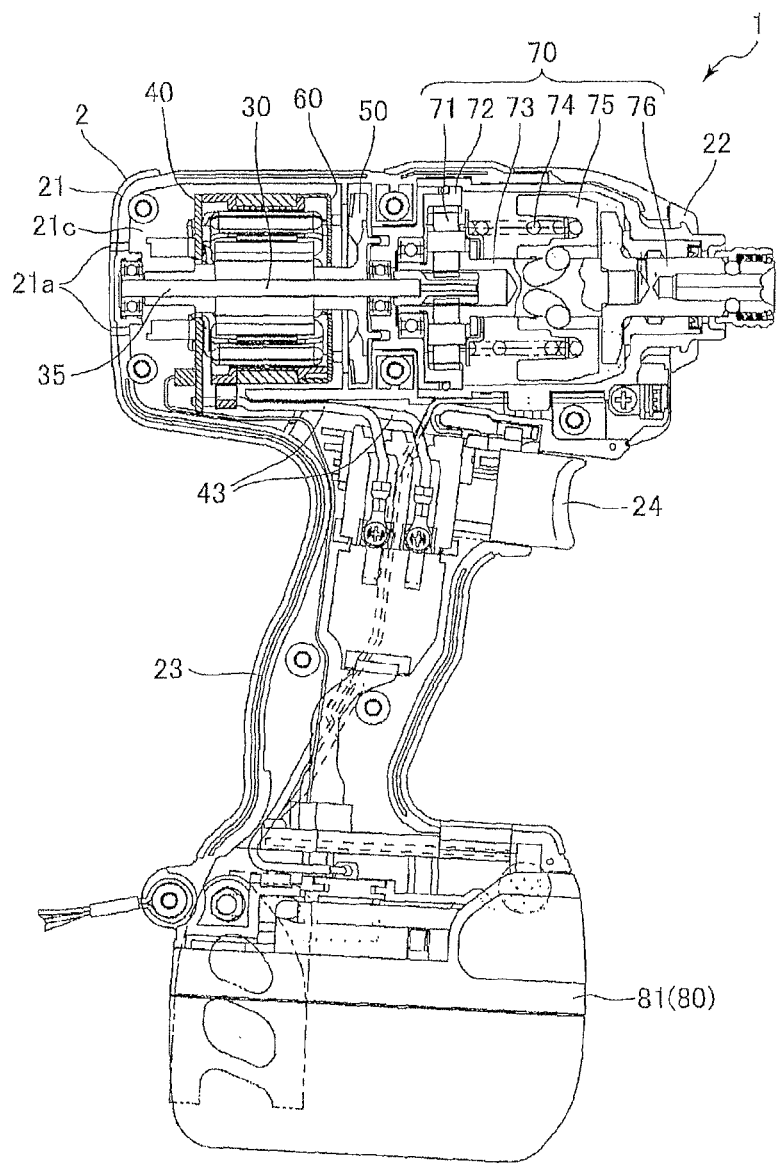
FIG. 1 is a cross-sectional view of a power tool according to an embodiment of the present invention.

A power tool according to an embodiment of the present invention will be described while referring to FIGS. 1 through 11. FIG. 1 shows an impact driver 1 serving as the power tool of the embodiment. First, the overall structure of the impact driver 1 will be described with reference to FIG. 1.

The impact driver 1 has a housing 2 constituting the outer shell thereof. The housing 2 is configured of a motor housing 21, a power transmission housing 22 formed continuously with the motor housing 21, and a handle housing 23 extending downward from the motor housing 21 and the power transmission housing 22.

The motor housing 21 has a cylindrical shape and accommodates a brushless motor 30 serving as a drive source, a circuit board 40 for controlling the brushless motor 30, a fan 50, and a cover 60 for preventing dust from entering the brushless motor 30. Air intake holes 21a are formed in the rear of the motor housing 21 for introducing external air into the housing 2, and exhaust holes 21b (see FIG. 14) are formed in the front of the motor housing 21 for exhausting air from the power transmission housing 22. A ventilation path 21c is defined by the outer peripheral surface of the brushless motor and an inner peripheral surface 21A (see FIG. 2) of the motor housing 21. The ventilation path 21c allows communication between the air intake holes 21a and exhaust holes 21b (see FIG. 14).

The power transmission housing 22 accommodates a power transmission mechanism 70. The power transmission mechanism 70 is well known in the art as a mechanism having a speed reduction mechanism configured of a planetary gear 71 and a ring gear 72; an impact mechanism configured of a spindle 73, and a hammer 75 disposed on the spindle 73 and capable of sliding forward and rearward thereon, the hammer 75 functioning to apply an impact force through a spring 74; and an anvil 76 to which the rotational impact force of the hammer 75 is applied, the anvil 76 functioning to retain a tip tool (not shown). The power transmission mechanism 70 transmits the rotational force of the brushless motor 30 to the anvil 76 as a rotational impact force. A protruding part (not shown) is formed on the hammer 75, and a recessed part (not shown) corresponding to the protruding part of the hammer 75 is formed in the anvil 76. When the brushless motor 30 is driven, the rotational force of a drive shaft 35 of the brushless motor 30 is reduced by the planetary gear 71 and ring gear 72. The reduced rotational force is transferred to the spindle 73 to initiate a screw fastening operation. When a prescribed load or greater is not applied to the anvil 76, the protruding part of the hammer 75 engages in the recessed part of the anvil 76, causing the hammer 75 and anvil 76 to rotate as one. However, when a load exceeding this prescribed amount is applied to the anvil 76, the anvil 76 is locked in place and unable to rotate, the protruding part of the hammer 75 disengages from the recessed part of the anvil 76, and the hammer 75 advances due to the effect of the spring 74, producing an impact force.

A battery pack case 81 is detachably mounted on the lower end of the handle housing 23. The battery pack case 81 accommodates a battery pack 80 configured of lithium ion secondary batteries, nickel cadmium secondary batteries, or the like (not shown). The handle housing 23 is also provided thereon with a trigger switch 24 and accommodates part of the motor-driving circuit and wiring for supplying power from the battery pack 80 to the brushless motor 30. When the battery pack case 81 is mounted on the handle housing 23, the battery pack 80 and the motor-driving circuit are electrically connected through the trigger switch 24 and power wires 43 described later. In the following description, the anvil 76 side of the housing 2 will be referred to as the front side, the air intake holes 21a side as the rear side, the end with the motor housing 21 and power transmission housing 22 as the top, and the end with the battery pack case 81 as the bottom.

With the impact driver 1 having the above construction, an operator grips the handle housing 23 and pulls the trigger switch 24 to set the trigger switch 24 in an ON state. At this time, a drive force is transmitted from the brushless motor 30 to the hammer 75, causing the hammer 75 to apply a rotating impact force to a tip tool mounted in the anvil 76 in order to drive a screw.

Next, the structure of the brushless motor 30 according to the embodiment will be described with reference to FIGS. 2 through 15. The brushless motor 30 is primarily configured of a stator 31 having an outer cylindrical shape, a coil 32, a rotor 33 disposed inside the stator 31, and the drive shaft 35.

Figure 2:
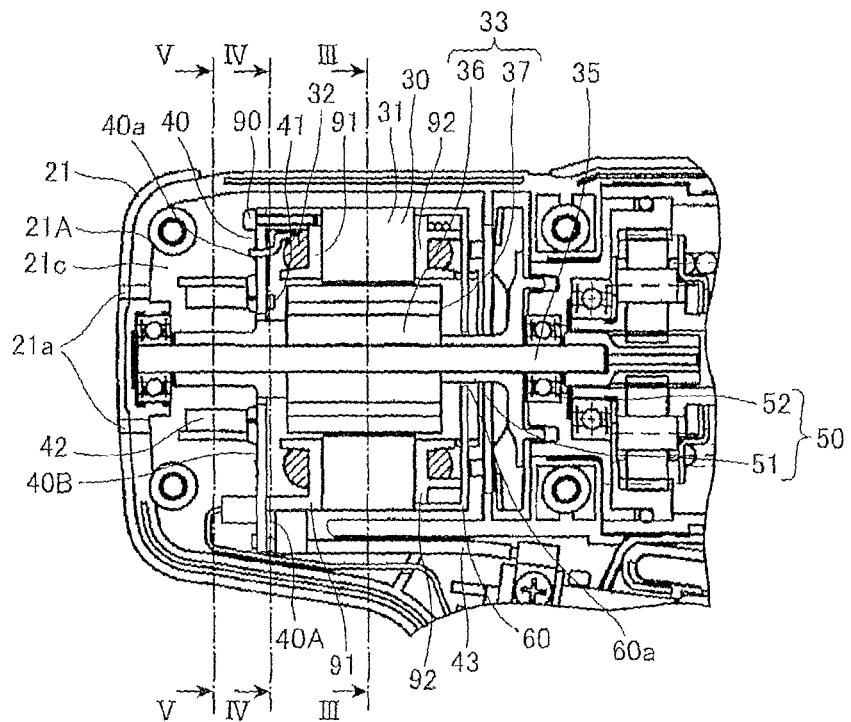
FIG. 2 is a partial enlarged cross-sectional view showing the power tool in FIG. 1.
Figure 3:
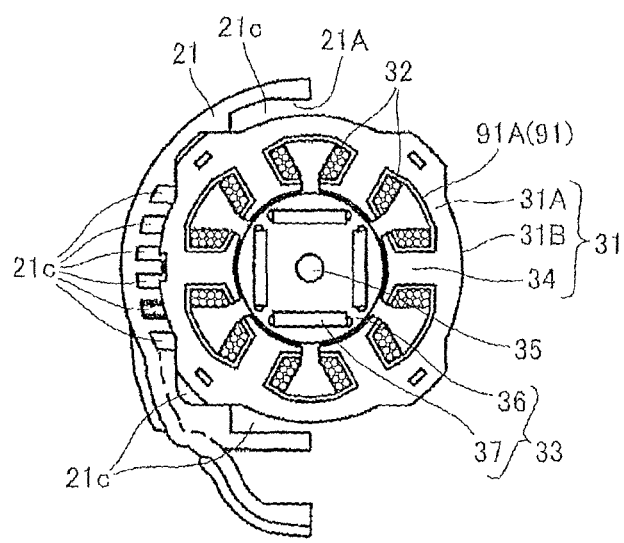
FIG. 3 is a cross-sectional view along a plane in FIG. 2.
Figure 4:
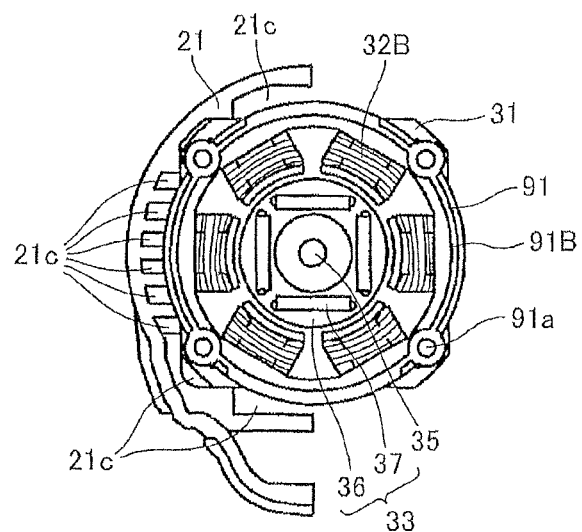
FIG. 4 is a cross-sectional view along a plane IV-IV in FIG. 2.

As shown in FIG. 3, the stator 31 has a cylindrical part 31A, and a plurality of teeth 34 extending in an axial direction of the cylindrical part 31A and protruding radially inward from the inner peripheral surface of the cylindrical part 31A. Part of the outer peripheral surface 31B of the stator 31 is held by the inner surface 21A and supported in the motor housing 21. The ventilation path 21c is defined between the remaining portion of the outer peripheral surface 31B and the inner peripheral surface 21A of the motor housing 21. As shown in FIG. 2, an insulating member 91 and an insulating member 92 are mounted on both ends of the stator 31 so as to cover the teeth 34. More specifically, the insulating member 91 is mounted on the rear end of the stator 31 near the air intake holes 21a, while the insulating member 92 is mounted on the front end of the stator 31 near the exhaust holes 21b.

Figure 6:
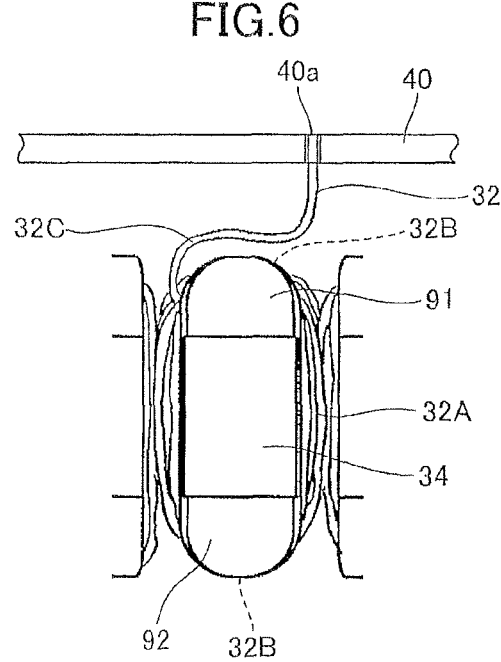
FIG. 6 is an explanatory diagram showing a beginning portion of a coil according to the embodiment.
Figure 7:
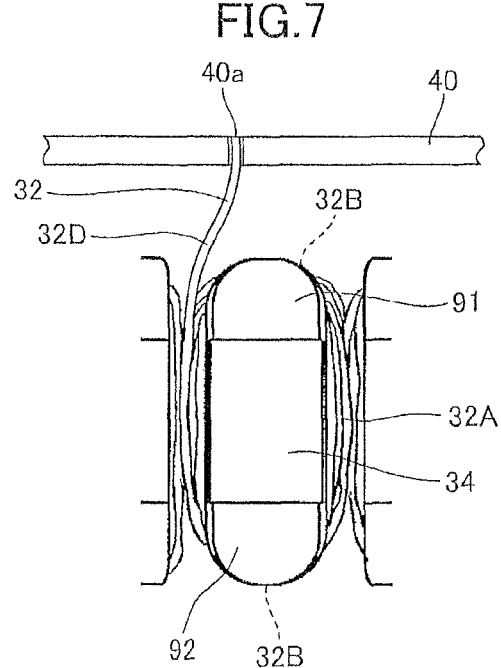
FIG. 7 is an explanatory diagram showing an ending portion of the coil according to the embodiment.
Figure 8:
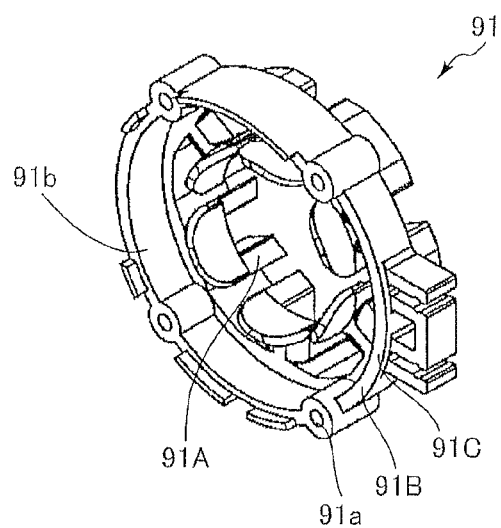
FIG. 8 is a perspective view of a rear part of an insulating member according to the embodiment.
Figure 9:
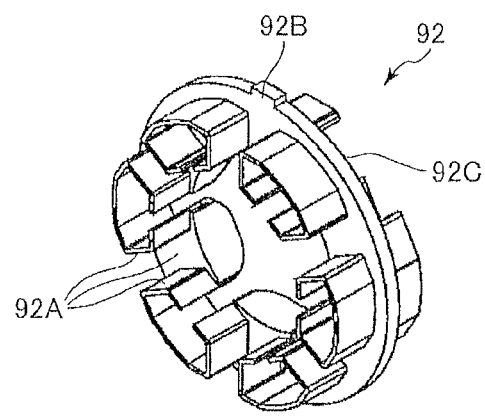
FIG. 9 is a perspective view of a front part of the insulating member according to the embodiment.

As shown in FIG. 8, the insulating member 91 has a stator covering part 91A for insulating the teeth 34 (see FIG. 3) and coil 32 (see FIG. 3) by covering the teeth 34, and an annular part 91B in which is formed female screw holes 91a and has a rear endface 91C defines annular opening 91b and the rear endface of the brushless motor 30. As shown in FIG. 9, the insulating member 92 has a front endface 92D and a stator covering part 92A for insulating the teeth 34 (see FIG. 3) and the coil 32 (see FIG. 3) by covering the teeth 34, similar to the insulating member 91. A positioning protrusion 92B is formed on the insulating member 92. As shown in FIGS. 3, 6, and 7, the insulating members 91 and 92 are held by the stator 31 by winding the coil 32 about the teeth 34 covered by the stator covering part 91A and positioning protrusion 92B. The coil 32 has an axial wound part 32A wound around the teeth 34 in the axial direction, and an axial end wound part 32B wound about the axial ends of the teeth 34, a beginning portion 32C and a ending portion 32D as shown in FIGS. 6 and 7. Through these windings, the insulating members 91 and 92 are held on the teeth 34.

As shown in FIG. 6, the coil 32 is continuously wound about the teeth 34 so as to overlap the beginning end of the winding, with the beginning end leading out from the inside of the winding. The beginning portion 32C of the beginning end extending out from the inside of the winding is bent into a crank-like shape.

As shown in FIG. 2, both ends of the drive shaft 35 are rotatably supported by bearings, which in turn are supported on the motor housing 21. A main body 36 of the rotor 33 is coaxially press-fitted about the drive shaft 35 and rotates together with the same. Four permanent magnet members 37 are embedded in the main body 36 at intervals in the rotating direction. The rotor 33 is concentric with the stator 31 and the drive shaft 35 and is disposed on a side of the inner peripheral surface of the stator 31.

The fan 50 is fixed to the front side of the drive shaft near the exhaust holes 21b (see FIG. 14) of the motor housing 21. The fan 50 rotates together with the drive shaft 35 when the brushless motor 30 is driven in order to draw external air in through the air intake holes 21a and to exhaust air out through the ventilation path 21c and the exhaust holes 21b (see FIG. 14).

Figure 12:
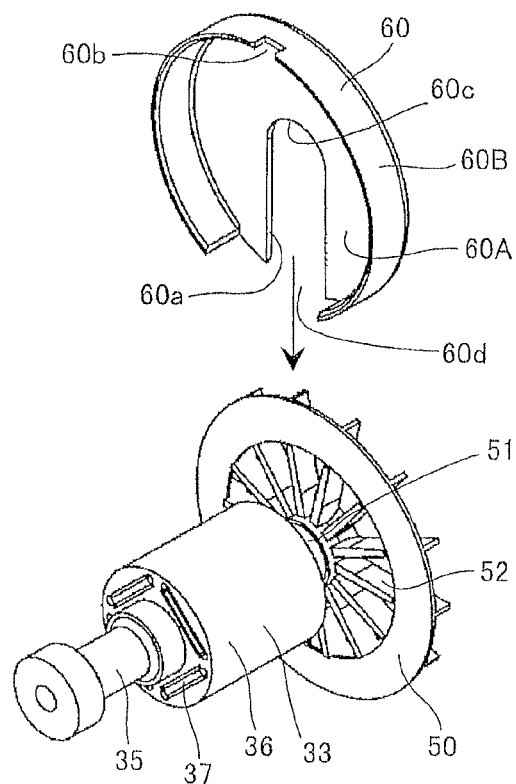
FIG. 12 is an explanatory diagram illustrating the assembly of a rotational shaft, cover, and fan according to the embodiment.
Figure 13:
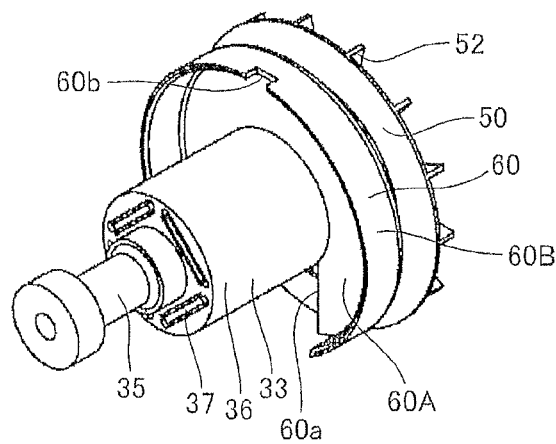
FIG. 13 is a perspective view of the rotor, cover, and fan fixed to the rotational shaft in the embodiment.

As shown in FIGS. 2 and 12, the fan 50 has a shaft 51 positioned concentric with the drive shaft 35 and having an end face fixed to an endface of the rotor 33, and a plurality of blades 52 extending radially outward from the shaft 51.

Next, the motor-driving circuit will be described. As shown in FIG. 2, the motor-driving circuit includes the circuit board 40 and is electrically connected to the coil 32. The motor-driving circuit functions to rotatably drive the rotor 33. The motor-driving circuit includes an inverter circuit configured of a bridge circuit well known in the art for conducting a drive current to the coil 32 of the brushless motor 30, and a control circuit configured of a CPU and the like for controlling the inverter circuit. The inverter circuit having switch elements is formed on the circuit board 40, while the control circuit and the like other than the inverter circuit is suitably arranged on several circuit boards (not shown).

The circuit board 40 is fixed to the air intake holes 21a side of the insulating member 91 so as to cover the entire annular opening 91b defined by the annular part 91B (see FIG. 8) of the insulating member 91. More specifically, four through-holes are formed in the circuit board 40 at positions corresponding to the female screw holes 91a (see FIG. 4) in the insulating member 91, and the circuit board 40 is fixed to the insulating member 91 by male screws 90 so that a front surface 40A of the circuit board 40 is in contact with the insulating member 91. The male screw 90 can be threadingly engaged with the female screw part 91a. That is, the circuit board 40 is fixed to the insulating member 91 by screwing the male screws 90 into the female screw holes 91a (see FIG. 4) of the annular part 91B on the insulating member 91. A Hall element 41 is provided on the front surface 40A of the circuit board 40 facing the insulating member 91 for detecting the rotated position of the rotor 33. A rear surface 40B on the opposite side of the circuit board 40 from the insulating member 91 includes six FETs 42 (the switch elements described above) for turning on and off the electric current flowing through the coil 32. The FETs 42 are electrically connected to the coil 32 via a wiring pattern provided on the circuit board 40. With a star connection, the neutral terminal of each phase in the three-phase coil 32 is electrically connected through the wiring pattern on the drive control circuit board 40 to form a neutral point. The base ends of the FETs 42 and the power wires 43 connected to the circuit board 40 are coated with an adhesive to prevent disconnection caused by vibrations during tool operations.

Figure 5:
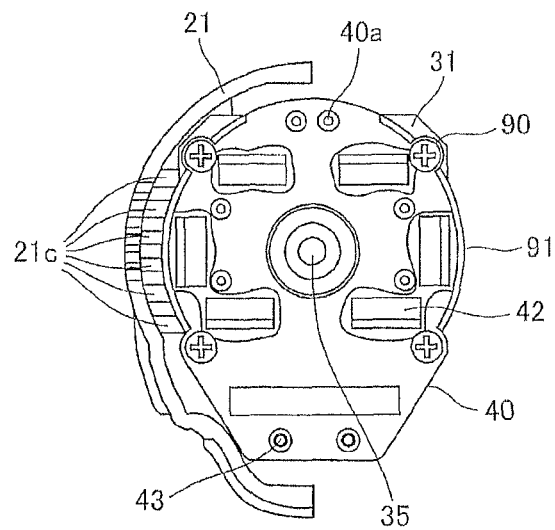
FIG. 5 is a cross-sectional view along a plane V-V in FIG. 2.

As shown in FIGS. 2, 5, and 6, the coil 32 is electrically connected to the circuit board 40 by soldering ends of the coil 32 to wiring holes 40a formed in the circuit board 40. Six of the wiring holes 40a are formed in the circuit board 40. The crank-shaped bent portion formed in the beginning portion 32C of the coil 32 and drawn out from the winding is connected to the circuit board 40.

The beginning portion 32C of the coil 32 connected to the circuit board 40 is bent in this shape to avoid interfering with the axial wound part 32A and the axial end wound part 32B connected to this beginning portion 32C. This bent portion absorbs vibrations produced in the circuit board 40 and coil 32, thereby reducing tensile stress produced in the coil 32 to prevent breakage. However, since the ending portion of the coil 32 extending from the axial wound part 32A and the axial end wound part 32B is not restrained by the axial wound part 32A and the axial end wound part 32B, as shown in FIG. 7, tensile stress produced by vibrations in the brushless motor 30 and circuit board 40 is not a problem.

When the brushless motor 30 is driven in the above construction, the fan 50 fixed to the drive shaft 35 rotates, drawing air into the motor housing 21 through the air intake holes 21a as shown in FIG. 2. The air drawn into the motor housing 21 cools the circuit board 40, flows through the ventilation path 21c defined by the outside of the brushless motor 30 and the inner surface of the motor housing 21 to cool the outside of the brushless motor 30, and is exhausted through the exhaust holes 21b. Hence, circulating fresh air through the ventilation path 21c in this way can cool the brushless motor 30 from the outer surface thereof.

Figure 14:
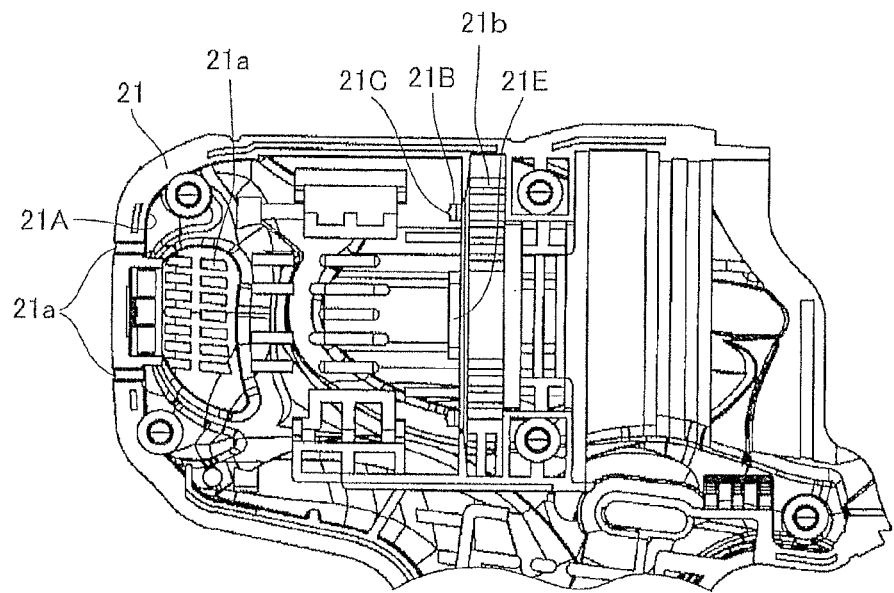
FIG. 14 is a partial enlarged view of a housing according to the embodiment.

Further, by providing the FETs 42 on the rear surface 40B and the circuit board 40 on the air intake hole 21a side, the fresh air introduced through the air intake holes 21a can more effectively cool the FETs 42 and circuit board 40 than when the circuit board 40 is provided on the exhaust hole 21b side (see FIG. 14).

Further, the circuit board 40 can be more easily connected electrically when provided on the rear surface 40B of the circuit board 40 than when not provided on the circuit board 40. Further, since a separate member need not be provided for fixing the FETs 42, this configuration reduces the number of required parts, thereby reducing the space required in the housing 2 for accommodating parts.

Further, by fixing the circuit board 40 to the insulating member 91 so that the circuit board 40 covers, e.g. acts as a cover member covering the entire annular opening 91b defined by the endface 91C of the annular part 91B of the insulating member 91 positioned on the air intake hole 21a side, air introduced through the air intake holes 21a does not enter the brushless motor 30. Accordingly, when the impact driver 1 is used in air containing wood or metal dust, such dust does not enter the brushless motor 30, preventing the dust from accumulating on the stator 31 and rotor 33 and causing these components to lock up.

Further, by providing the Hall element 41 on the front surface 40A of the circuit board 40 for detecting the position of the rotor 33, a separate member need not be provided for fixing the Hall element 41, thereby reducing the number of required parts and the space in the housing 2 for accommodating such parts. Further, fixing and positioning the circuit board 40 and insulating member 91 relative to each other improves the accuracy in positioning the Hall element 41.

By employing the insulating member 91 both to insulate the teeth 34 and coil 32 and to fix the circuit board 40 in place, this construction avoids increasing the number of required parts, thereby achieving the effects described above.

Since the circuit board 40 is fixed to the insulating member 91 with the male screws 90, the circuit board 40 vibrates together with the insulating member 91 insulating the teeth 34 and coil 32 when the impact driver 1 is operated. Accordingly, the circuit board 40 and the coil 32 vibrate together, reducing the tensile stress generated in the coil 32 and preventing breakage of the same. The male screws 90 also more reliably fix the circuit board 40 to the insulating member 91 than tab or adhesive.

Figure 10:
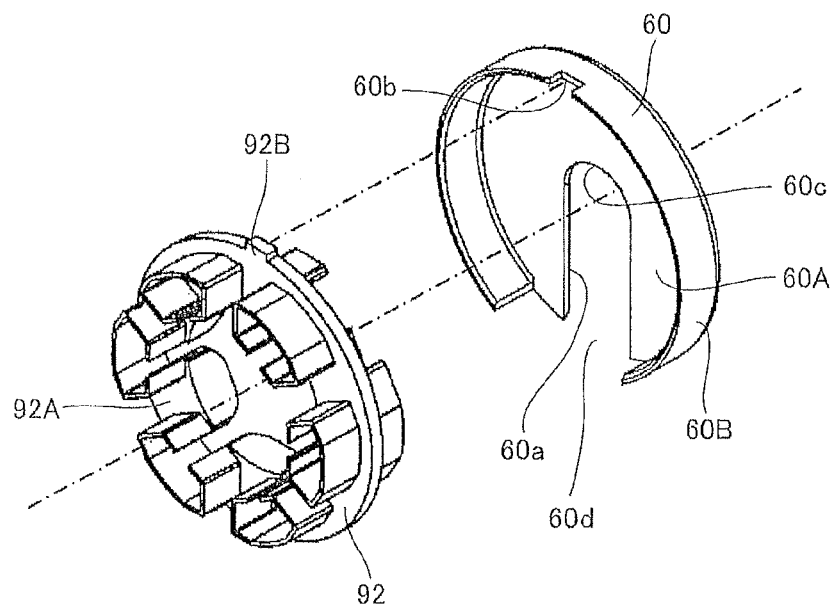
FIG. 10 is an exploded diagram illustrating the assembly of a cover and the insulating member according to the embodiment.
Figure 11:
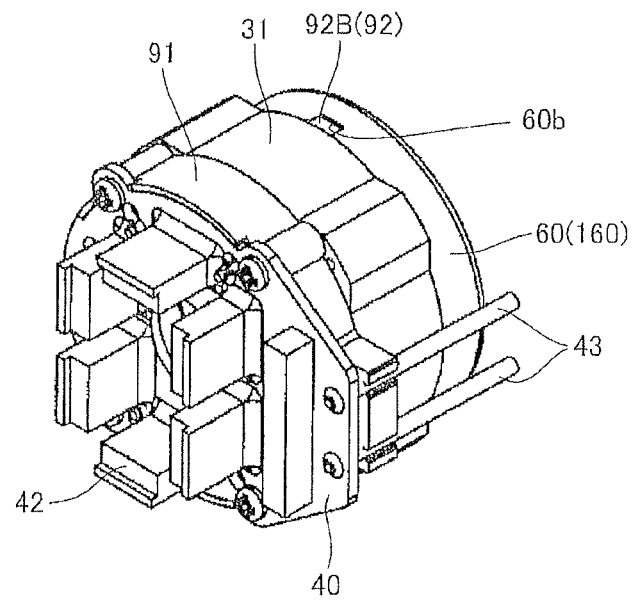
FIG. 11 is a perspective view of a brushless motor according to the embodiment on which a circuit board and cover are fixed.

As shown in FIG. 1, the cover 60 is fixed between the fan 50 and the front endface 92C of the brushless motor 30 so as to cover this endface 92C on the exhaust holes 21b side (the front side). As shown in FIG. 10, the cover 60 includes a cover surface 60A, and a peripheral edge 60B. A recessed part 60b is formed in the peripheral edge 60B for engaging with the positioning protrusion 92B provided on the insulating member 92. As shown in FIG. 12, a notch 60a having a width slightly larger than the diameter of the shaft 51 is formed in the cover surface 60A. The notch 60a has an inner end 60c, and an outer end 60d formed as an opening in the peripheral edge of the cover surface 60A. The drive shaft 35 and the shaft 51 of the fan 50 are disposed near the inner end 60c of the notch 60a. Specifically, after press fitting the rotor 33 and fan 50 on the drive shaft 35, the outer end 60d of the notch 60a is positioned at the drive shaft 35. The cover 60 is moved relative to the drive shaft 35 so that the drive shaft 35 is inserted into the notch 60a and positioned near the inner end 60c of the notch 60a, thereby positioning the cover 60 between the rotor 33 and the fan 50. Next, the drive shaft 35 and the integrally formed cover 60 (see FIG. 13) are inserted into the stator 31 (see FIG. 11). As shown in FIG. 11, the positioning protrusion 92B of the insulating member 92 held in the stator 31 is engaged with the recessed part 60b formed in the cover 60, thereby fixing and positioning the cover 60 between the fan 50 and the endface of the stator 31 so as to cover the endface of the stator 31 through the insulating member 92. Note that the rotor 33 and drive shaft 35 are not shown in FIG. 11.

With this construction, the cover 60 for preventing dust from entering the brushless motor 30 is disposed between the fan 50 and the front endface 92C of the brushless motor 30 on the exhaust hole 21b side so as to cover the front endface 92C. Hence, when cooling the brushless motor 30, the cover 60 can reduce the amount of cooling air that enters the brushless motor 30 through the front endface 92C of the brushless motor 30 on the exhaust hole 21b side. Therefore, this configuration can reduce the amount of dust in the cooling air that gets into the brushless motor 30 when the impact driver 1 is used in air containing wood or metal dust.

By forming the notch 60a in the cover 60 so that the cover 60 can straddle the drive shaft 35, it is not necessary to dispose the brushless motor 30, cover 60, and fan 50 on the drive shaft 35 in order in the axial direction of the drive shaft 35. Rather, the fan 50 can be fitted onto the drive shaft 35 before inserting the cover 60 between the brushless motor 30 and fan 50, allowing the fan 50 to be more easily fixed to the drive shaft 35 without interference from the cover 60, thereby improving the ease of assembly.

Further, the circuit board 40 is fixed in close contact with the insulating member 91, covering the end of the brushless motor 30 on the air intake hole 21a side. Accordingly, both endfaces of the brushless motor 30 are sealed shut to prevent cooling air from entering, thereby more effectively preventing dust from entering the brushless motor 30. Since the circuit board 40 also serves as a cover for preventing dust from entering the brushless motor 30, this configuration eliminates the need to provide a separate cover, thereby preventing an increase in the number of parts. This configuration also achieves the shortest possible wiring path required for electrically connecting the coil 32 wound about the stator 31 to the circuit board 40.

By engaging the positioning protrusion 92B formed on the insulating member 92 in the recessed part 60b formed in the cover 60, the cover 60 and insulating member 92 can be fixed and positioned relative to each other. Further, since the insulating member 92 is held against the cylindrical stator 31 by the windings of the coil 32 and the stator 31 in turn is supported in the inner peripheral surface 21A of the motor housing 21, the cover 60 and stator 31 can be fixed via the insulating member 92 and the cover 60 can be prevented from rotating together with the rotor 33 and drive shaft 35, without providing a separate member.

Figure 15:
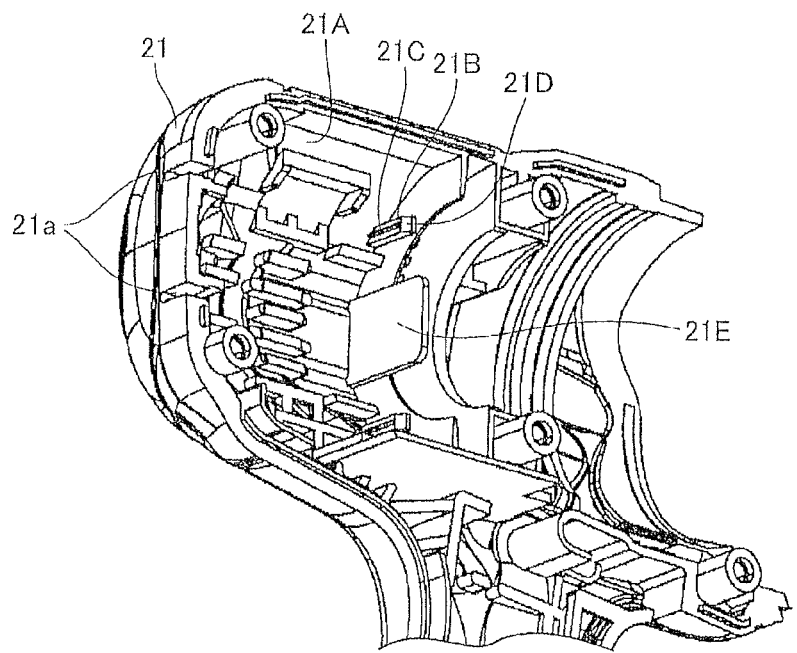
FIG. 15 is a perspective view of the housing according to the embodiment.

As shown in FIGS. 14 and 15, the motor housing 21 is provided with a rib 21B for fixing the cover 60, and a shielding wall 21E disposed at a position corresponding to or facing the notch 60a formed in the cover 60 for shielding the notch 60a. The rib 21B includes a deforming part 21C that deforms when the cover 60 is fixed to the motor housing 21, and a tapered part 21D for guiding the cover 60 to a mounting position in the motor housing 21. The deforming part 21C has a substantially triangular cross section and protrudes rearward from the rib 21B by at least the assembly tolerance of the cover 60 and housing 2. The size and shape of the rib 21B is such that the rib 21B does not completely block the ventilation path 21c and, hence, does not hinder the flow of cooling air.

When mounting the cover 60 together with the stator 31 in the motor housing 21, the tapered part 21D guides the cover 60 into place, while pressure from the rib 21B positions and fixes the cover 60 in the motor housing 21. More specifically, the tip of the deforming part 21C provided on the rib 21B is pressed against the cover 60 and flattened to accommodate the cover 60 so that the cover 60 is fixed in the motor housing 21. Accordingly, the brushless motor 30 is positioned and fixed in the motor housing 21 through the cover 60, and the cover 60 is fixed between the fan 50 and the front endface 92C of the brushless motor 30 on the exhaust hole 21b side so as to cover the front endface 92C of the brushless motor 30. At this time, the shielding wall 21E formed on the motor housing 21 shields the portion of the endface on the exhaust hole 21b side of the brushless motor 30 open due to the notch 60a, thereby ensuring that the endface of the brushless motor 30 on the exhaust hole 21b side is covered with no gaps.

By providing the shielding wall 21E on the motor housing 21 so that the cover 60 and shielding wall 21E can cover the exhaust holes 21b side of the brushless motor 30 without leaving any gaps, this configuration reduces the amount of dust that enters the brushless motor 30, thereby improving the dust-proof property of the brushless motor 30. Further, providing the shielding wall 21E on the motor housing 21 eliminate the need to provide a separate member for sealing the notch 60a, thereby avoiding an increase in the number of parts required. Further, since the shielding wall 21E provided on the motor housing 21 at a position corresponding to the notch 60a blocks the notch 60a when the cover 60 is mounted in the motor housing 21, this configuration eliminates the need for a separate step to seal the notch 60a, preventing an increase in the number of assembly steps.

Since the rib 21B provided on the motor housing 21 for fixing the cover 60 to the motor housing 21 is positioned in the ventilation path 21c, the cover 60 vibrates together with the motor housing 21 if vibrations are produced when operating the impact driver 1, preventing rattling of the cover 60.

Further, providing the rib 21B on the motor housing 21 eliminates the need to provide a separate member for fixing the cover 60 to the motor housing 21, avoiding an increase in the number of parts.

By deforming to fix the cover 60 to the motor housing 21, the deforming part 21C provided on the rib 21B can absorb manufacturing error or assembly error in the cover 60 and motor housing 21, thereby more reliably fixing the cover 60 to the motor housing 21.

Further, since the rib 21B has a tapered part 21D for guiding the cover 60 to a prescribed position in the motor housing 21, this construction facilitates insertion of the cover 60 into the motor housing 21, thereby improving the ease of assembly.

While the invention has been described in detail with reference to the embodiment thereof, it would be apparent to those skilled in the art that various changes and modifications may be made therein without departing from the spirit of the invention.

For example, the cover 60 is fixed to the drive shaft 35 after the rotor 33 and fan 50 have been press-fitted onto the drive shaft 35. Next, the cover 60 and drive shaft 35 are fixed as a unit to the stator 31, after which the cover 60 and stator 31 are inserted as a unit into the motor housing 21. However, the present invention is not limited to this method of assembly. For example, after inserting the drive shaft 35 having the rotor 33 and fan 50 press-fitted thereon into the stator 31 and before inserting the stator 31 into the motor housing 21, the cover 60 may be positioned so that the outer end 60d of the notch 60a is positioned at the drive shaft 35 and may be moved relative to the drive shaft 35 so that the drive shaft 35 is guided in the notch 60a toward the inner end 60c of the notch 60a. In this way, the cover 60 can be fixed between the fan 50 and the endface of the stator 31 such that the cover 60 covers the front endface 92C through the insulating member 92. While it should be obvious, the fan 50 may also be fixed to the drive shaft 35 after positioning the cover 60 between the fan 50 and the front endface 92C of the brushless motor 30 on the exhaust hole 21b side.

Figure 16:
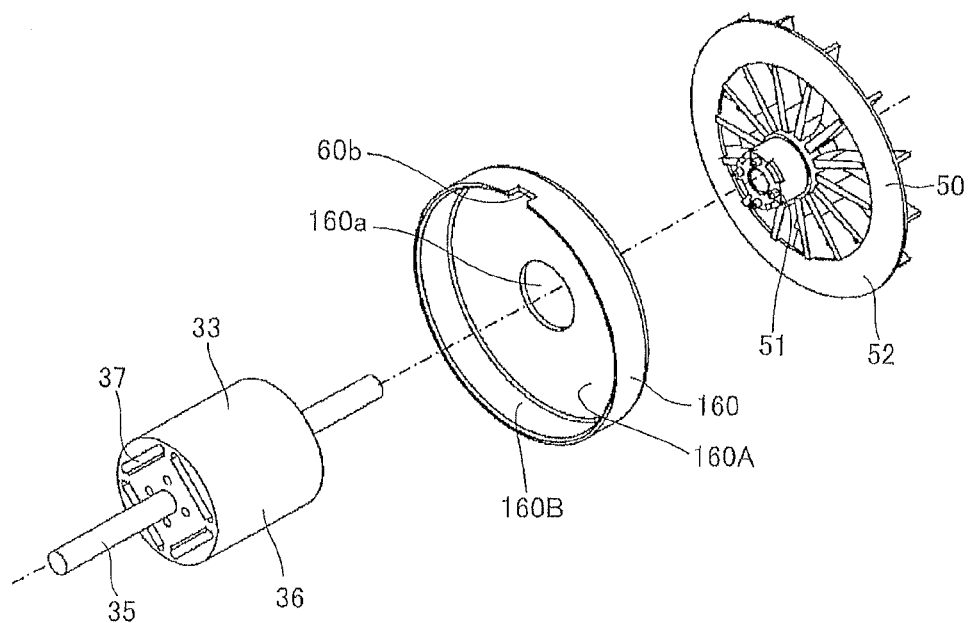
FIG. 16 is an exploded diagram illustrating assembly of the rotational shaft, cover, and fan according to a variation of the embodiment.
Figure 17:
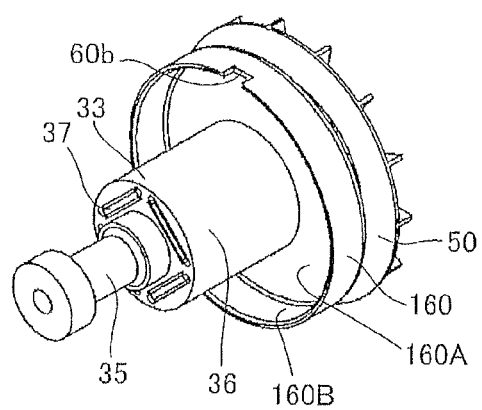
FIG. 17 is a perspective view of the rotor, cover, and fan fixed to the rotational shaft in the variation of the embodiment.
Figure 18:
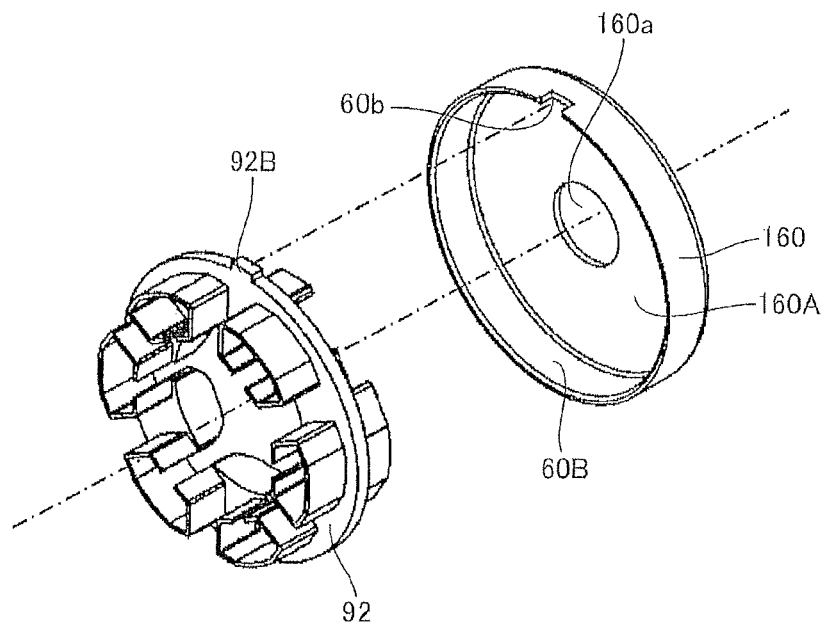
FIG. 18 is an exploded diagram illustrating the assembly of the cover and insulating member according to the variation of the embodiment.

Further, in the embodiment described above, the notch 60a is formed in the cover 60, but the cover is not limited to this shape. For example, a cover 160 such as that shown in FIG. 16 may be used. The cover 160 has a cover surface 160A, and a peripheral edge 160B. An insertion hole 160a having a slightly larger diameter than that of the shaft 51 (see FIG. 12) is formed in the cover surface 160A for inserting the drive shaft 35 and the shaft 51 of the fan 50. The peripheral edge 160B has the recessed part 60b formed therein for engaging with the positioning protrusion 92B provided on the insulating member 92, as shown in FIG. 18. As illustrated in FIGS. 16 and 17, the cover 160 having this construction is first disposed between the rotor 33 and fan 50 before press fitting the rotor 33 and fan 50 onto the drive shaft 35. Next, the cover 160 together with the drive shaft 35 (FIG. 17) is inserted into the stator 31, as shown in FIG. 11. By engaging the positioning protrusion 92B of the insulating member 92 held in the stator 31 in the recessed part 60b of the cover 160, the cover 160 is positioned and fixed so as to cover the endface of the stator 31 through the insulating member 92. In FIG. 11, the rotor 33 and drive shaft 35 are not shown. Since this construction eliminates the need to provide the shielding wall 21E on the motor housing 21 as described in FIGS. 14 and 15, the shape of the motor housing 21 can be simplified, reducing manufacturing costs.

In the embodiment described above, the circuit board 40 is closely fixed to the insulating member 91 in order to cover the air intake hole 21a side of the stator 31. However, a separate cover may be provided for covering the air intake hole 21a side of the stator 31.

Alternatively, instead of closely fixing the circuit board 40 to the insulating member 91 in order to cover the air intake hole 21a side of the stator 31 as described in the embodiment, the circuit board 40 may be separated from the brushless motor 30. Even though the air intake hole 21a side of the brushless motor 30 is not covered with this construction, the cover 60 covers the exhaust hole 21b end of the brushless motor 30, producing a considerable flow resistance within the brushless motor 30. The cooling air is less likely to enter the brushless motor 30 and can be circulated through the ventilation path 21c formed between the inner peripheral surface 21A of the motor housing 21 and the outer surface of the brushless motor 30 and exhausted from the housing 2. Even if some of the cooling air flows out of the ventilation path 21c into the brushless motor 30, the flow rate and amount of cooling air in the brushless motor 30 is restricted by the cover 60 and, hence, the dust in the cooling air impacts the brushless motor 30 with a very small force that will not cause damage to the brushless motor 30.

Further, while the rib 21B is provided on the motor housing 21 in the embodiment, a rib for fixing the cover 60 to the housing 2 may be provided on the cover 60 instead.

Further, while the deforming part 21C provided on the rib 21B of the motor housing 21 has a substantially triangular cross section in the embodiment described above, the deforming part 21C is not limited to this shape, provided that the deforming part 21C can deform and absorb dimensional tolerance when fixing the cover 60 to the motor housing 21.

Further, while the recessed part 60b is formed in the cover 60 and the positioning protrusion 92B for engaging with the recessed part 60b is provided on the insulating member 92 in the embodiment described above, the protruding part may instead by provided on the cover 60 and a complementary recessed part for engaging with this protruding part may be provided on the insulating member 92.

Figure 19:
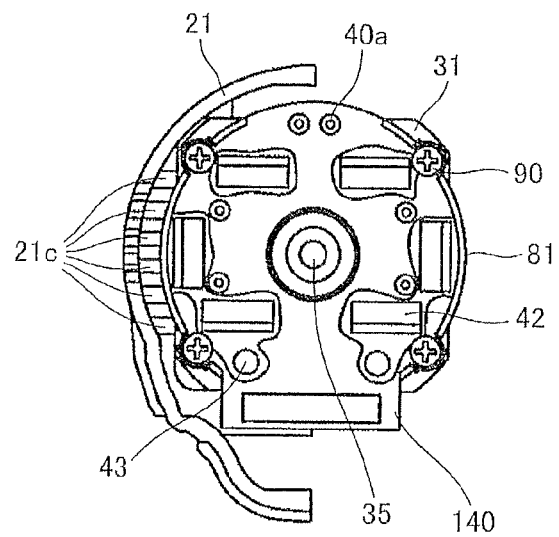
FIG. 19 is a cross-sectional view of a circuit board according to the variation of the embodiment.

Further, while the power wiring 43 are connected to the circuit board 40 as shown in FIG. 5, the power wiring 43 may be connected to a circuit board 140 as shown in FIG. 19. Since this construction, the base ends of the FETs 42 and the power wires 43 can be coated with the common adhesive.

The power tool of the present invention is suitable for application to an impact driver or other tool having a cooling fan.

What is claimed is:
1. A power tool comprising:
 a housing including a motor housing and a handle housing extending downward from the motor housing;
 a brushless motor disposed in the motor housing and including:
  a stator around which a coil is wound and having an outer surface;
  a rotor rotatably disposed in the stator and having a shaft extending in an axial direction; and
 an insulating member fixed to the stator and including a first extending portion, the first extending portion being disposed outside the stator and protruding from the stator in the axial direction; and
 a circuit board extending in a direction substantially perpendicular to the shaft and fixed to the first extending portion of the insulating member, the circuit board including a second extending portion extending downward from the first extending portion of the insulating member;

a fan fixed to the shaft of rotor, the fan being disposed on an opposite side of the circuit board from the stator, air flowing from the circuit board toward the fan by rotation of the fan;

a Hall element for detecting a position of the rotor, the Hall element being provided on the circuit board; and a power wire connected to the second extending portion of the circuit board and extending under the first extending portion of the insulating member.

2. The power tool according to claim 1, wherein the circuit board is fixed to the first extending portion of the insulating member by a screw.

3. The power tool according to claim 1, wherein the housing has a protruding portion protruding from an inner surface of the housing inward in the radial direction, the protruding portion supporting the outer surface of the stator.

4. The power tool according to claim 1, wherein the housing has an air intake hole and an air exhaust hole formed therein, the housing defining a path providing communication between the air intake hole and the air exhaust hole, the path including a space defined between the housing and the outer surface of the stator.

5. The power tool according to claim 4, further comprising a plurality of switch elements for driving the blushless motor, the plurality of switch elements being cooled by the air generated and flowing along the path by the rotation of the fan, the plurality of switch elements being closer to the air intake hole than to the air exhaust hole.

6. The power tool according to claim 1, wherein the outer surface of the stator has a first engaging portion formed therein, the first engaging portion extending in a front-rear direction parallel to the shaft;

wherein the inner surface of the housing has a second engagement portion formed therein, the second engagement portion extending in the front-rear direction and engaged with the first engagement portion of the stator.

7. The power tool according to claim 1, wherein the coil has:

a wound portion wound along the stator; and an end portion connecting the circuit board, a portion of the coil between the wound portion and the end portion being bent.

* * * * *